Figure 1:
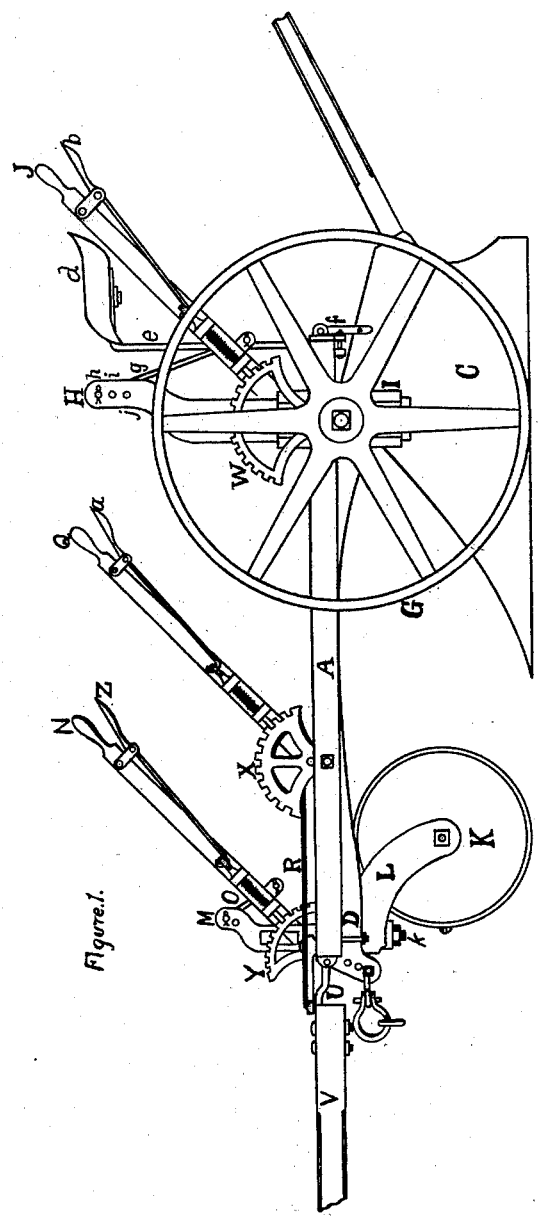
Figure 2:
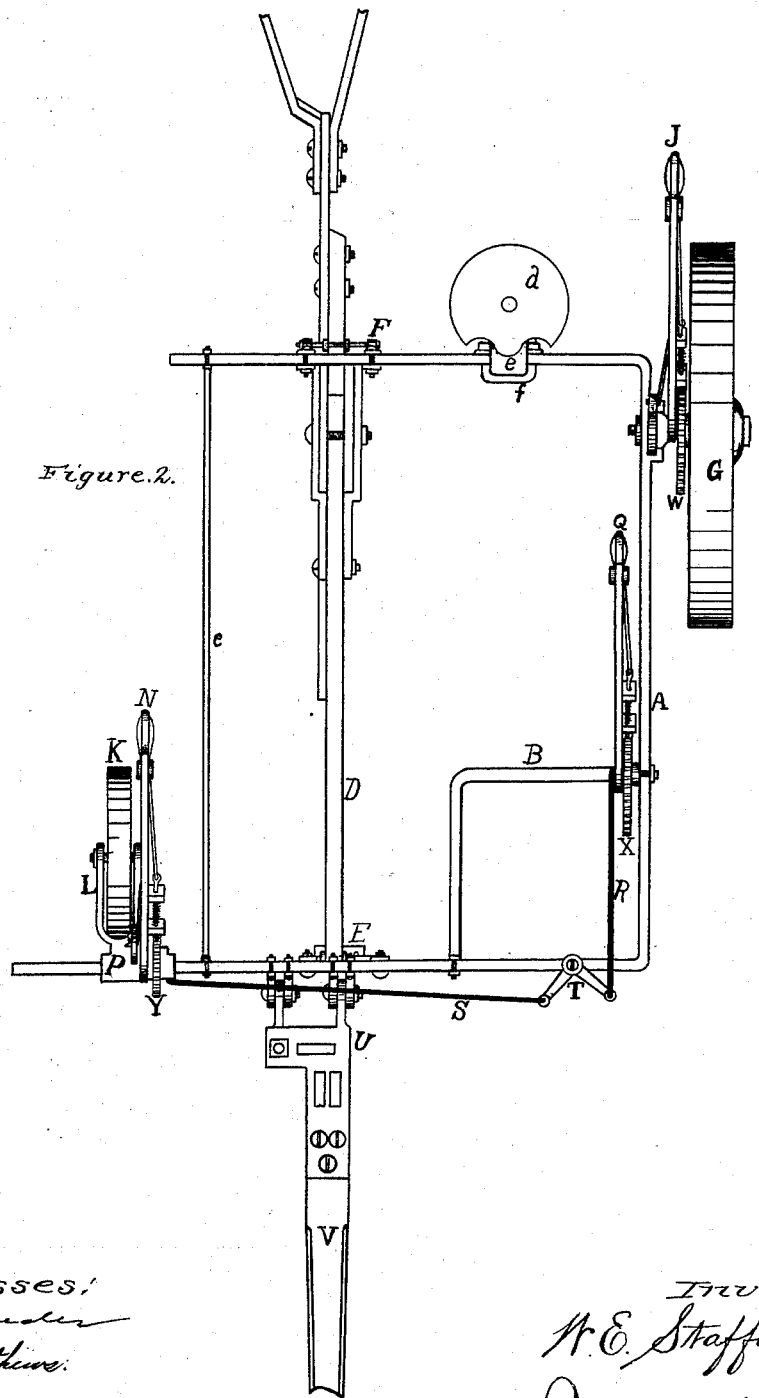

(No Model.) 3 Sheets—Sheet 1.

W. E. STAFFORD.
RIDING ATTACHMENT FOR PLOWS.

No. 523,017. Patented July 17, 1894.

(No Model.) 3 Sheets—Sheet 2.
W. E. STAFFORD.
RIDING ATTACHMENT FOR PLOWS.

No. 523,017. Patented July 17, 1894.

Witnesses:

Inventor
W. E. Stafford
By James J. Sheehy
Attorney (No Model.) 3 Sheets—Sheet 3.

W. E. STAFFORD.
RIDING ATTACHMENT FOR PLOWS.

No. 523,017. Patented July 17, 1894.

UNITED STATES PATENT OFFICE.

WILLIAM E. STAFFORD, OF SHEDDEN, CANADA.

RIDING ATTACHMENT FOR PLOWS.

SPECIFICATION forming part of Letters Patent No. 523,017, dated July 17, 1894.

Application filed December 29, 1893. Serial No. 495,082. (No model.) Patented in Canada October 18, 1893, No. 44,508.

*To all whom it may concern:*

Be it known that I, WILLIAM E. STAFFORD, a subject of the Queen of Great Britain, residing at the village of Shedden, in the county of Elgin, in the Province of Ontario and the Dominion of Canada, have invented a new and useful Riding Attachment for Plows, of which the following is a specification, and for which I have obtained Letters Patent No. 44,508, dated October 18, 1893, in the Dominion of Canada.

This invention relates to improvements in riding attachments for plows, and among other things has for its object, to provide a detachable frame for supporting the various parts, which will be of a cheap and durable construction; to provide an adjustable carrying wheel for the said frame, to provide means of attaching the frame to and detaching it from a plow, without affecting the utility of the plow when used without the attachment; to provide a vertically and laterally adjustable gage wheel for regulating the width of a furrow, which will perform the additional function of a turning wheel, and to afford quick and ready means for adjusting the whole machine both vertically and horizontally.

Other objects and advantages will appear from the following specification and claims, when taken in connection with the drawings which are hereunto annexed, in which—

Figure "1" is a left side elevation of my improved riding attachment for plows, with a plow attached. Fig. "2" is a plan view of the same. Fig. "3" is a right side elevation of the parts which I call the guide or gage and turning or caster wheel. Fig. "4" is also a right side elevation of the same with the operating mechanism belonging thereto in a different position. Fig. "5" is a front elevation of a clamp which secures the attachment to the forward end of a plow beam. Fig. "6" is a plan of an adjustable tongue iron which secures the tongue to the attachment or the plow. Fig. "7" is a front elevation of a clamp which secures the attachment to the rear end of a plow beam.

Referring by letters to the said drawings, "A" indicates the main frame which is made from a single piece of bar iron or steel bent into rectangular form and of sufficient strength to resist the vibrations of the operating parts. To this frame the operating parts are secured as hereinafter described, the said frame being secured to a plow as will be presently described.

"B" is an angular brace of iron secured to the forward left hand angle of the main frame which serves the additional function of a foot rest for the driver being arranged in front of his seat.

"C" is an ordinary plow, "D" being the beam thereof to which the main frame is secured as will be hereinafter described.

"E" is an adjustable clamp, of which Fig. "5" is a front elevation, and is for the purpose of securing the forward terminal or branch to the forward end of the plow beam. "F" is also an adjustable clamp, a front elevation of which is shown in Fig. "7" its function being to secure the rear branch or terminal of the main frame to the rear part of the plow beam.

The above described clamps "E" and "F" are adjustable transversely along the front and rear branches of the main frame respectively, they are also adjustable in height and size, the more readily to conform to the varying height, size and shape of different plow beams, and may be inverted to allow the plow beam to be placed above the frame.

"G" is a carrying wheel journaled on a sliding arm "H" which is adjustable vertically, in a grooved guide "I" through the medium of the hand lever "J," the connecting rod "g" and the segmental rack "W." The sliding arm "H" is provided with a series of perforations "h," "i" and "j," whereby the connection between the operating lever and the said sliding arm is made adjustable without exhausting the scope of the segmental rack "W."

"I" is a grooved guide secured to the main frame, in which the sliding arm "H" moves vertically.

"J" is a hand lever for the purpose of adjusting the sliding arm "H" and obviously the carrying wheel "G."

"K" is a gage or guide wheel which also performs the functions of a turning or casterwheel, it is journaled into a forked carrying arm, this arm being secured to a slide which moves vertically in a guide attached to a sleeve which moves transversely on the forward branch of the main frame.

"K'" is a grooved guide in which the slide supporting the forked carrying arm moves vertically.

"L" is a forked carrying arm into which the wheel "K" is journaled.

"M" is the slide above referred to and to which the forked carrying arm is secured.

Figure 3:
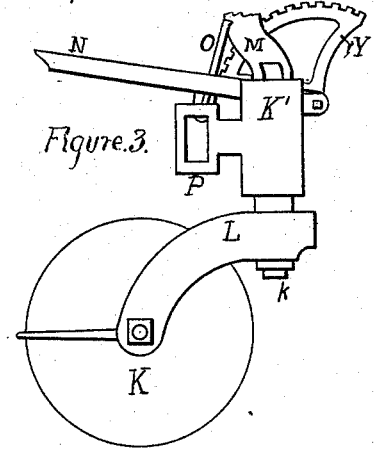
Figure 4:
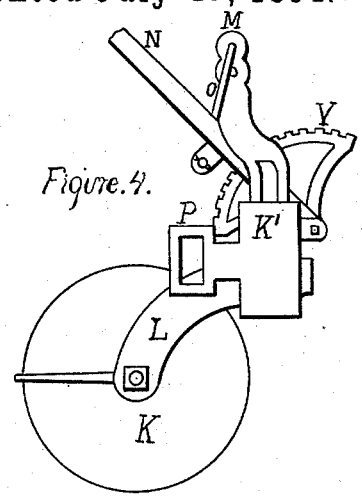
Figure 5:
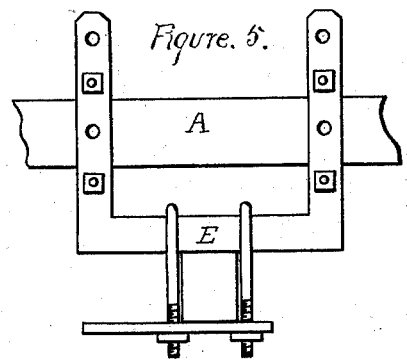
Figure 6:
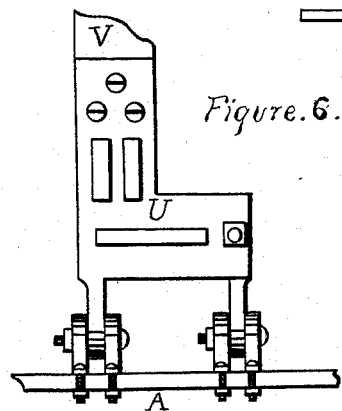
Figure 7:
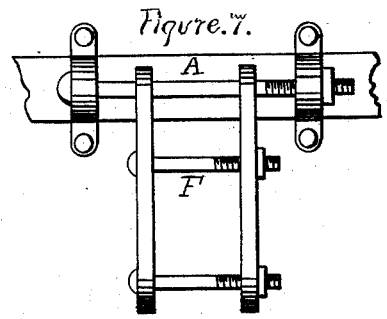

"N" is a hand lever connected with the slide "M" by the link or rod "O," when this lever is depressed as in Fig. 3, the wheel is allowed to turn caster like on a trunnion or swivel "k" and is so used for turning the machine when the plow is out of the ground. When the lever is elevated as in Fig. "4" the forked carrying arm and wheel are held in line with the plow by the guide "K'" being in contact with a square on the forked carrying arm "L."

"P" is a sliding sleeve cast integral with "K'" carried on the forward branch or terminal of the main frame and is adjustable transversely as will be hereinafter explained.

"Q" is a hand lever which operates the sliding sleeve "P" through the medium of the rods "R" and "S" and the bell crank "T."

"U" is a tongue iron by means of which the tongue or pole is secured to the frame, it is made adjustable and may be secured direct to the plow jaws.

"V" is the tongue or pole secured to the frame with the adjustable tongue-iron, and may be secured direct to the plow-jaws with the same attachment.

"W" "X" and "Y" are segmental racks.

"z" "a" and "b" are thumb levers connected with spring-pressed bolts which engage the teeth of the segmental racks.

"c" is a rod of iron or steel used as a brace to strengthen the forward terminal of the main frame.

"d" is the driver's seat supported by the spring "e" with an adjustable clamp "f" in such a manner that it may be adjusted vertically and transversely in order to place the driver's weight on the plow or carrying wheel as desired.

"g" is a connecting rod or link, through the medium of which the hand lever "J" is connected with the sliding arm "H" to enable the operator to adjust the carrying wheel.

"h" "i" and "j" are perforations in the sliding arm "H" to engage the connecting rod or link "g" and are so arranged as to conform to the varying heights of plows.

"k" is a trunnion or swivel joint on which the forked carrying arm "L" is allowed to turn when the hand lever "N" is depressed as in Fig. "3."

Having described my invention, what I claim is—

1. In a plow, the combination of the angular frame A, the slidable sleeve P, mounted on the forward transverse branch of the main frame, and carrying the vertically-disposed guide K', a hand lever, bars R, and S, and the bell-crank lever T, intermediate of and connecting said lever and the sleeve P, the vertically movable slide M, arranged in the guide K', the fork L, pivoted on the lower end of the slide M, and carrying a wheel K; said fork L, being adapted, when the slide is raised, to engage the side of the guide K', so as to prevent the wheel from swinging or moving laterally, the lever N, connected by a link with the slide M, and a suitable means for locking said lever in its adjusted positions, substantially as specified.

2. The combination of a plow having a beam as D, the angular main frame A, connected with the beam of the plow, the vertically-disposed guide I, connected to the side bar of the frame A, adjacent to the rear end thereof, the vertically movable slide H, arranged in the guide I, and carrying a traveling wheel, the slidable sleeve P, mounted on the forward transverse branch of the main frame and carrying the vertically disposed guide K', a hand lever, bars R, and S, and the bell crank lever T, intermediate of and connecting said lever and the sleeve P, the vertically-movable slide M, arranged in the guide K', the fork L, pivoted on the lower end of the slide M, and carrying a wheel K; said fork L, being adapted when the slide is raised, to engage the side of the guide K', so as to prevent the wheel from swinging or moving laterally, the lever N, connected by a link with the slide M, and a suitable means for locking said lever in its adjusted positions, substantially as specified.

3. The combination with the main frame, and a plow having a beam as D; of the rectangular iron E, comprising the horizontal body portion and the vertical branches having a plurality of apertures, clips connected to the vertical branches of said iron E, and embracing the forward transverse bar of the main frame, clips connected to the horizontal portion of the iron E, and carrying a plate adapted to rest beneath the plow beam, and the clamp F, comprising adjustable clips mounted on the rear transverse bar of the main frame, a horizontal bolt carried by said clips, plates pivotally connected to the said horizontal bolt and adapted to rest on opposite sides of a plow beam and bolts connecting the said plates, all substantially as and for the purpose specified.

WILLIAM E. STAFFORD.

Witnesses:
W. L. WICKETT,
J. Z. LONG.